3 Sheets—Sheet 1.

G. R. POSTLETHWAITE.
MACHINE FOR MAKING BOLTS AND NUTS.

No. 111,082. Patented Jan. 17, 1871.

3 Sheets—Sheet 2.

G. R. POSTLETHWAITE.
MACHINE FOR MAKING BOLTS AND NUTS.

No. 111,082. Patented Jan. 17, 1871.

3 Sheets—Sheet 3.
G. R. POSTLETHWAITE.
MACHINE FOR MAKING BOLTS AND NUTS.
No. 111,082. Patented Jan. 17, 1871
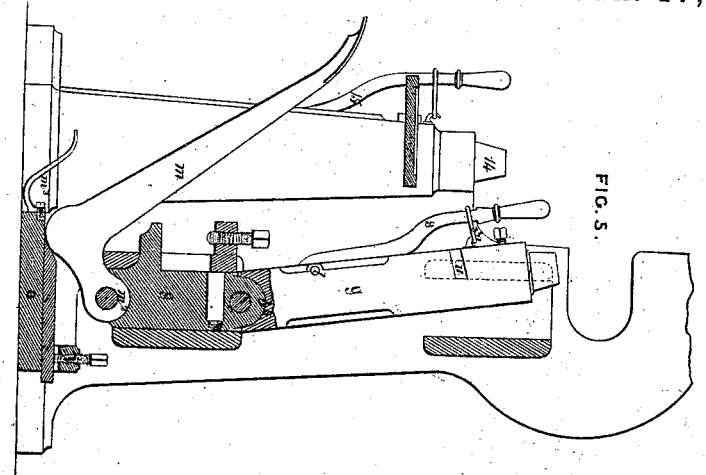
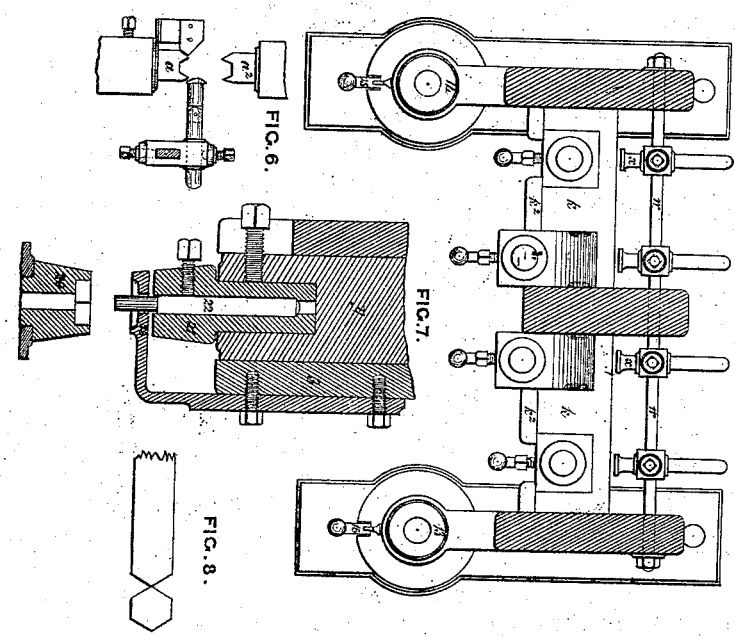

UNITED STATES PATENT OFFICE.

GEORGE RICHARD POSTLETHWAITE, OF BIRMINGHAM, GREAT BRITAIN.

Letters Patent No. 111,082, dated January 17, 1871.

IMPROVEMENT IN MACHINES FOR MAKING BOLTS AND NUTS.

The Schedule referred to in these Letters Patent and making part of the same.

Be it known that I, GEORGE RICHARD POSTLETHWAITE, of Birmingham, in the Kingdom of Great Britain, mechanical engineer, have invented new and useful "Improvements in Machinery for the Manufacture of Screw-Nuts, Bolts, Spikes, Rivets, Screw-Blanks, and other like articles;" and I do hereby declare that the following is a full, clear, and exact description of the construction and operation of the same, reference being had to the annexed drawings making part of this specification.

My invention relates to machinery, hereinafter described, whereby I can effect the heading of bolts by a rapid succession of short blows, instead of, as is at present the case in all other machines, by one crushing stroke, thereby avoiding the necessity of powerful gearing, and saving a great amount of wear and tear.

The work under operation is brought up to the action of headers by means of bottom slides working vertically under the action of foot-levers, or by a self-acting motion derived from the machine, and the heated iron may be thus quickly operated upon, securind solidity and perfection of workmanship. All gearing is dispensed with, a much lighter machine is sufficient to do the work, and considerable less driving-power is required.

By the combined action of the several parts of my machine, as hereinafter fully described, it is adapted to a great variety of work, and will form iron into endless shapes, point, cut off, head, punch, dress up, &c. By one or other of the devices much longer or shorter bolts, of more varied description and greater finish, may be made than can be done any other machine at present in use, while every motion requisite for making screw-bolts is obtained.

Figure 1:
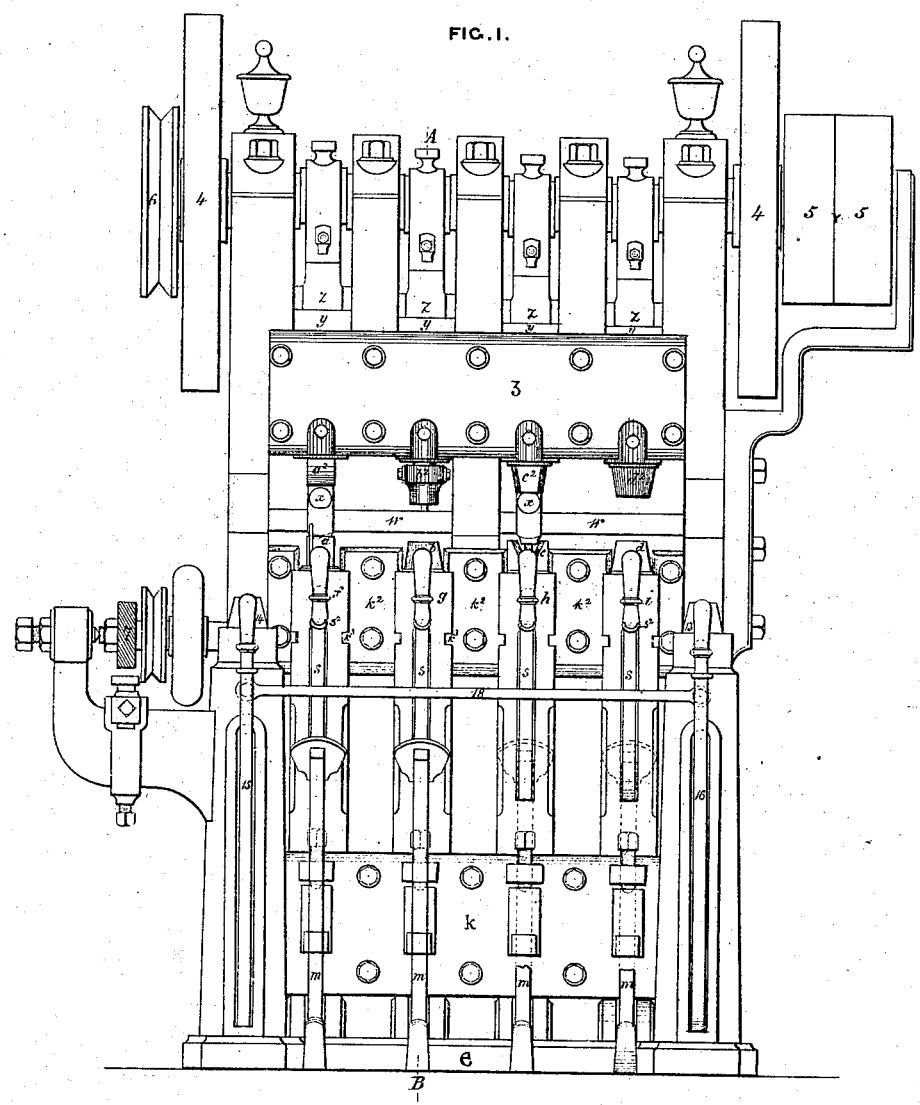
Figure 2:
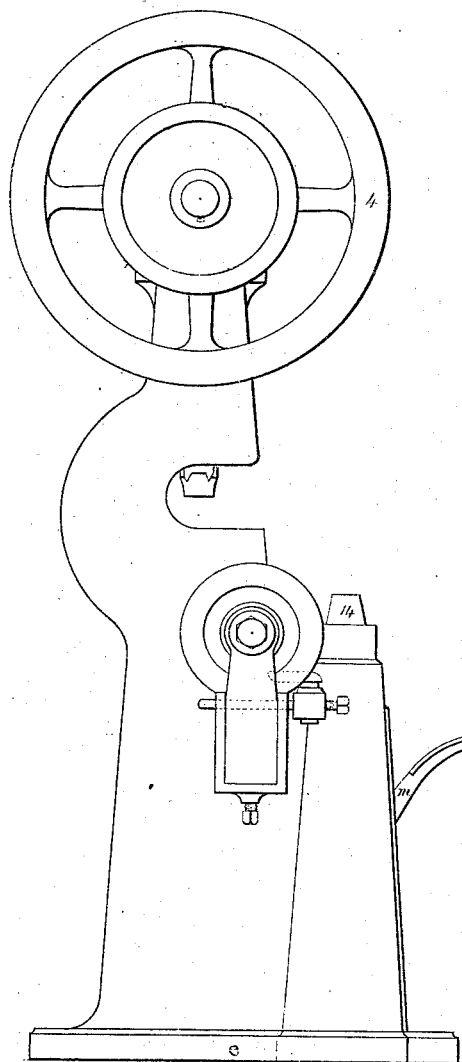
Figure 3:
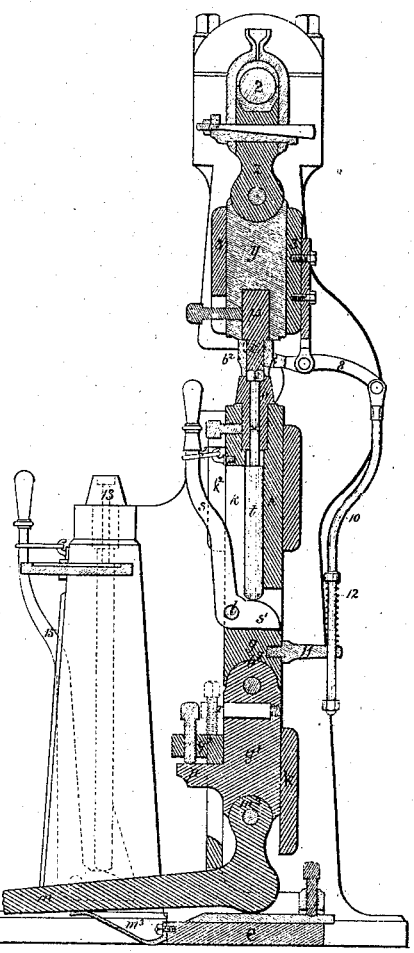

Figure 1 represents a front elevation, and
Figure 2 an end elevation of a machine for manufacturing the articles intended.
Figure 3, a transverse vertical section of the same taken through A B, fig. 1.
Figure 4 is a plan, and
Figure 5 a vertical section, showing some of the slides carrying the lower dies, inclined forward for the purpose of removing the articles from the dies.
Figure 6 shows the cutting and shaping tools.
Figure 7 shows in section, on a large scale, the dies or tools used in the machine, fig. 1, with the tools in fig. 6 for the making of nuts.
Figure 8 shows the end of a bar of heated iron made by the operation of the cutting tools, fig. 6.

$a\ b\ c\ d$ are dies or tools supported upon vertical slides marked $f\ g\ h\ i$.

The said slides are capable of rising and falling in the guides marked $k$ and plates $k^2$, and are also capable of being turned outward upon the joints $b^2$, as shown in figs. 3 and 5.

The bottom sections $f$, $g'$, $h'$, and $i'$, of each of the slides to which the upper section $f, g, h$, and $i$, is jointed at $b$, is pivoted to the short end $m^2$ of the lever $m$, the lower end of the said lever constituting a treadle, on which the workman puts his foot to raise the said slide.

It will be observed that, when the lever $m^1$ is depressed, its shorter arm $m^2$ is in a right vertical line with the slides $f, g, h$, and $i$, above, its lower angle resting on the bed-plate $e$ of the machine below, so that a firm bearing is thus obtained, by the intermediate slide and lever, for the die on the upper end of the slide, directly upon the said bed-plate $e$.

The treadle $m$ is raised by the spring $m^3$. The position of the slides, when raised by the levers $m\ m^1$, is represented in fig. 3, and when depressed, in figs. 4 and 5.

On the lower part of each guide $k$ is a cross-bar, $q^2$, carrying a screw-stop, against which a projection, $p$, on the slide, strikes. By this means the height to which the slide can be raised by the operation of the treadle-lever $m\ m^2$ is regulated.

The distance to which the slides can descend may be regulated by a second screw-stop, $r$, fig. 3, which stop, on the descent of the slide, bears against the top of the cross-bar $q^2$. The stop $r$ is only used under special circumstances, as hereinafter explained.

At about the middle of each of the slides $f\ g\ h\ i$ a second lever, $s$, is jointed, the upper end of the said lever being connected to the slide by means of a spring or elastic loop or band, $s^2$.

The lower end of the lever $s^1$ passes through and works in a slot in the slide. This lever serves to turn the slide upon its joint, (as shown in figs. 4 and 5,) for removing the bolt or article from the die, and also for projecting the finished bolt or article from the die.

This latter operation is effected by the rod $t$ in the axis of the slide, (see fig. 3,) the bottom of which rod rests on the short end or arm of the said lever $s^1$.

When the lever $s^1$ is pulled and the slide turned on its joint, as illustrated in fig. 5, the short end or arm of the said lever at the same time raises the rod $t$ and projects the bolt or article from the die. The forward or outward motion of the slides, as in fig. 5, is prevented (excepting when the said slides are in their lowest position) by means of the front guide-plates $k^2\ k^2$, against which the front of the slides work. (see fig. 4.)

When the slides are at their lowest position after the making of a bolt or article, slots $u$ (see fig. 5) in the said slides are brought opposite projections $k^3$ on the plates $k^2$, and the said slides can then be turned outward upon their joints $b^5$, the said projections $k^3$ working in the said slot $u$ during the outward motion of the slides.

At the back of the machine is a bar, $w$, carrying a series of adjustable stops, $x$ $x$, a stop being situated opposite each of the dies $a$ $b$ $c$ $d$. One of these stops is shown, in fig. 6, in connection with the die $a$.

The inner end of the stop is jointed, as shown, for the purpose of permitting of the rising motion of the slide, as hereinafter explained.

Over the dies or tools $a$ $b$ $c$ $d$ a series of movable dies or tools, marked $a^2$ $b^2$ $b^3$ $c^2$ $d^2$, work. The upper tool $a^2$ forms a pair with the lower die or tool $a$; the upper tool $b^2$ $b^3$ forms a pair with the lower die or tool $b$; the tool $c^2$ pairs with $c$; and $d^2$ pairs with $d$.

Each of the above upper movable dies is carried by a plunger, $y$, the upper end of which is connected by a link, $z$, with a crank on the principal shaft 2, the said cranks being arranged at different angles. The plungers $y$ work in the fixed guide 3.

By the rotation of the shaft 2 a rapid rising and falling motion is given to the upper dies $a^2$ $b^3$ $c^2$ $d$.

4 4 are fly-wheels on the ends of the crank-shaft 2; and 5 5 are fast-and-loose pulleys.

On the end of the shaft 2 is a pulley, 6, for driving the rotating cutter 7, hereinafter explained.

The first pair of dies or tools $a$ $a^2$ of the machine are for cutting and shaping the iron for making nuts. These dies are shown separately in fig. 6.

The second pair of dies, $b$ $b^2$ $b^3$, are used for making bolts and other articles with heads. These dies are shown in section in fig. 3.

The external die or head-box $b^2$, in which the head of the bolt is shaped by the descent of the inner die or pressing tool $b^3$ $b^2$, is worked by the lever 8, forked at its inner end, said lever being connected by the rod 10, and arm 11 with the slide $g$.

As the slide $g$, carrying the die $b$, is raised by the operation of the treadle-lever $m$ $m^2$, the spring 12 is compressed and the lever 8 made to turn upon its joint and cause the descent of the head or die-box $b^2$ upon the lever-die $b$ before the descent of the inner die or pressing-tool $b^3$.

The third pair of dies $c$ $c^2$ are swaging tools, for swaging nuts and bolts and such like.

The fourth pair of dies $d$ $d^2$ are for finishing or rounding the tops of nuts or heads of bolts, and so forth.

At the side of the machine are dies or tools 13 14, to be used in the manufacture of bolts and nuts. These dies are provided with levers 15 and 16, of the kind hereinafter described, for raising the bolts or articles from the dies.

A table, 18, runs along the front of the machine, upon which the workman may place the hand-tools he may employ.

The upper and lower dies or tools, represented in fig. 7, which are used with the cutting tools $a$ $a^2$, fig. 1, for the manufacture of nuts, are situated in the machine, fig. 1, in the place occupied by the dies or tools, $b$ $b^2$, or the other pair of dies $c$ $c^2$ or $d$ $d^2$.

The dies, fig. 7, consist of a lower die, 20, carried by the slide, the said die having nearly the figure of the extremity of the nut to be made, and an upper flat die, 21, fixed to the plunger $y$ of the machine. Said upper side die 21 has in its axis a punch, 22, for punching the hole in the nut, and the said die 21 has at its under side a supplementary die, 23, carried by a spring arm, secured to the fixed guide 3 of the machine. This supplementary die 23 is of a concave figure, and when, by the descent of the die 21, the said die 23 is pressed upon the top of and made to complete the lower die 20, the said supplementary die effects the rounding of the top of the nut.

To make screw-nuts by the use of the improved machinery, take a heated bar of iron the end of which has been previously shaped, place it over the lower die $a$, and against the stop $x$ at the back of the die, the bar being guided by a side guide. By placing the foot upon the treadle of the slide $f$ the said slide is raised and the die $a$ brought within the range of action of the upper die $a^2$.

As the slide and die are raised the die pushes the jointed end of the stop $x$ out of the path of the upper die $a^2$. By the descent of the upper die $a^2$ the end of the heated bar is forced into the lower die $a$, and shaped to the form shown on a large scale in fig. 8, the nut being connected to the bar by a slight web, and also ready shaped for the next nut to be formed.

The nut attached to the bar being removed from the dies, is placed in the lower die 20, fig. 7, arranged in the machine, fig. 1, and the said die, with the nut in it, is brought within the range of the upper die or tool by depressing the treadle of the slide carrying it.

By the descent of the upper die 21 the supplementary die 23 is closed upon the die 20, and the punch 22 is made to punch the hole completely through the said nut, the metal during the punching being forced into every part of the closed dies 20 and 23. The descent of the punch also separates the partly-made nut from the bar to which it was adhering The nut thus made may be removed from the dies by means of a mandrel driven into it, and be completed by means of the swaging tools $c$ $c^2$ and rounding tools $d$ $d^2$, fig. 1, the mandrel serving to turn and expose the sides of the nut to the action of the swaging-machine; or the nut may be partially punched, leaving a small wad, which may be removed by means of a hand-punch.

The nut is finally transferred to the pair of tools $d$ $d^2$, for rounding the top of the nut, and for perfecting the hole, the lower tool $d$ being furnished with a peg, on which the shape of the hole is perforated.

The forms of the dies or tools may be varied to suit the particular kind of nut or the work to be done.

In making bolts, spikes, and other headed articles by the use of the improved machinery, rods of the size of the shank required may be used, or thicker rods, which may be swaged down by means of suitable tools, as $c$ $c^2$, after which place it in the lower die $b$, and, by means of the treadle carrying said die, raise die and rod within the range of action of upper die $b^2$ $b^3$, raise the slide $y$, and die or head-box $b^2$ thereby descends upon the lower die $b$ and incloses the projecting end of the rod. By the descent of the plunger $y$ the pressing tool $b^3$ enters the hollow die $b^2$ and forms the head of the bolt or article, as represented in fig. 3. The said head may be perfected, if desired, by means of the swaging and snapping tools above described.

When the stems of the bolts, &c., are longer than ten inches, the side tools 13 and 14 may be used, the heads being made by means of collars welded and swaged into form.

In order to remove the bur or pin from the heads, bolts, &c., the rotating cutter 7, situated at one end of the machine, figs. 1 and 2, may be used.

What I claim as my invention, and desire to secure by Letters Patent, is—

1. The combination of a lower vertical die-holder or slide, made in two parts and hinged together, as and for the purpose described, a lever, $m$ $m^2$, for elevating and supporting said die-holder, and an upper vertically-reciprocating die-holder or plunger $y$, as herein set forth.

2. The combination of the die-holder and lever, specified in the first claim, and the lever $s$.

3. The combination of the die-holder and lever specified in the first claim, the lever $s$, and the ejecting-pin $t$.

4. The combination of the die-holder and lever specified in the first claim, and the screw-stops and bar $q^2$.

5. The combination of the die-holder and lever specified in the first claim, the plates $k^2$ and projections $k^3$ thereon.

6. The combination of the die-holders and lever specified in the first claim, the dies $b\ b^2\ b^3$, lever 8, rod 10, and spring 12, as set forth.

7. The combination of the series of jointed levers, die-holders or slides, the series of levers $m$ for elevating and supporting said slides or holders, the series of levers $s$, the series of upper reciprocating die or punch-holders or plungers, the series of dies $a\ b\ c\ d$, and the series of tools $a^2\ b^2\ c^2\ d^2$, as set forth.

G. R. POSTLETHWAITE.

Witnesses:
T. SUITER SMITH,
    *Birmingham, England,*
H. TRAVERS EDGE, *his clerk.*